United States Patent Office 2,981,696
Patented Apr. 25, 1961

2,981,696

PREPARATION OF ALUMINA-COMBINED HALOGEN COMPOSITE

George L. Hervert, Downers Grove, and Herman S. Bloch, Skokie, Ill., assignors, by mesne assignments, to Universal Oil Products Company, Des Plaines, Ill., a corporation of Delaware No Drawing. Filed June 5, 1957, Ser. No. 663,583

18 Claims. (Cl. 252—441)

The present invention relates to the production of alumina and is specifically directed toward a novel and improved method for manufacturing an alumina-combined halogen composite which is particularly suited for utilization in the manufacture and use of metal-containing catalytic composites.

The present application is a continuation-in-part of our co-pending application Serial Number 370,542, filed July 27, 1953, now abandoned.

Alumina, as porous aluminum oxide either in its many anhydrous forms or as aluminum oxide hydrate, and as aluminum hydroxide, is widely employed throughout the chemical and petroleum industries. Alumina is used as a dehydrating, treating or purifying agent and is often combined with other refractory inorganic oxides including silica, magnesia, thoria, boron oxide, zirconia, titania, mixtures of the same, etc. Various physical modifications of one of the previously mentioned forms of alumina are known as activated alumina or activated alumina of commerce, and are especially used for their pronounced catalytic activity and adsorptive capacity.

Alumina or aluminum hydrate exists in various physical modifications; the more common types of anhydrous alumina are as follows: Alpha-alumina, known as corundum, is the form of alumina which is stable at high temperatures and finds widespread use as a particular type of refractory material. Gamma-alumina is very stable, but undergoes a physical change to alpha-alumina at temperatures in excess of about 1800° F. This form of anhydrous alumina is particularly preferred for utilization as the catalytically active carrier material in the manufacture of metal-containing catalysts. Epsilon-alumina is the alumina which is formed as a thin film on the surface of metallic aluminum during oxidation by wet air or oxygen and acts as a protective coating over the elemental aluminum underneath.

The following alumina hydrates or aluminum hydroxides are common, and may be prepared in the laboratory:

Gamma-$Al_2O_3 \cdot 3H_2O$ or gibbsite may be prepared by aging boehmite in a cold alkaline solution.

Alpha-$Al_2O_3 \cdot 3H_2O$ or bayerite is also formed by aging boehmite in a cold basic solution, but is unstable and is transformed gradually into gibbsite.

Alpha-$Al_2O_3 \cdot H_2O$ or diaspore occurs abundantly in nature.

Gamma-$Al_2O_3 \cdot H_2O$ or boehmite may be prepared in a variety of ways, one of the simplest being to add ammonium hydroxide to a water solution of aluminum chloride. The material originally precipitated is thought to be an amorphous alumina flock which rapidly grows in crystal size, yielding crystalline boehmite. Aging boehmite in ammonium hydroxide solution transforms the boehmite first to metastable bayerite and finally to the stable gibbsite. Although bayerite actually contains two additional molecules of water, it may be transformed into boehmite when it is contacted with hot water in excessive water-washing treatments.

Whatever form of alumina is employed, and whatever its intended use, it is necessary that the alumina be substantially completely pure, and especially free from contaminants which, if present, would induce adverse effects toward the particular function which is intended. That alumina be substantially free from contaminants is particularly required for those functions wherein the alumina is utilized either as a catalyst in itself, or as a catalytically active carrier material in the manufacture of catalysts containing catalytic components in addition to the alumina. An object of the present invention is to produce high-purity alumina which is especially suitable for utilization as a carrier material for other catalytically active components. In the interest of simplicity, the following discussion will be restricted to the production of alumina for use in the manufacture of particular catalytic composites. It is not intended, however, to limit unduly the method of the present invention to this use, and it is understood that the present invention will produce a high-purity alumina-combined halogen composite which may be utilized for any of the purposes hereinbefore described.

The particular catalytic composite for which the alumina produced by the method of the present invention is highly suited, comprises combined halogen and an active metal component such as platinum, palladium, vanadium, chromium, tungsten, cobalt, copper, silver, gold, iridium, rhenium, ruthenium, molybdenum, nickel, osmium, mixtures of two or more, etc. The metal component may exist either in the elemental state, or in combination as the halide, oxide, nitrate, sulfate, etc.

Generally, the amount of the metal component composited with the alumina-combined halogen composite is small compared to the quantities of the other components combined therewith. For example, platinum and/or palladium generally comprise from about 0.01% to about 5% by weight of the total catalyst, and more often from about 0.1% to about 1% by weight. The use of other metallic components, with or without palladium and/or platinum, is dependent upon the use for which the particular catalyst is intended. In any case, however, the concentrations of the metal components will be small and will generally be within the range of from about 0.1% to about 5% by weight of the total catalyst.

The halogen is generally composited with the catalyst in concentrations of from about 0.01% to about 8% by weight of the total catalyst, and may be either fluorine, chlorine, iodine, bromine or mixtures of the same. In general, fluorine appears to be less easily removed from the catalyst and is, therefore, preferred in many instances. It is understood that the halogen may comprise a mixture of two or more of the aforementioned halogens; a particularly preferred mixture comprises fluorine and chlorine. The halogen is combined with one or more of the other components of the catalyst and is, therefore, referred to as combined halogen.

Another object of the present invention is to produce an alumina-combined halogen composite to which the metallic components hereinabove described may be added in any suitable manner or which may be employed as a catalyst without the addition of other catalytic components. The present invention produces an alumina containing the quantity of combined halogen which is desired in the final catalyst.

In one embodiment, the present invention provides a method for producing an alumina-combined halogen composite which comprises reacting aluminum with liquid water in the presence of a sufficient quantity of a mercury halide to yield an alumina-combined halogen composite substantially free from unreacted aluminum and containing from about 0.1% to about 8% by weight of combined halogen based on the dry weight of the composite.

As hereinbefore set forth, alumina exists in many forms; of these, gamma-alumina is the preferred form for use as a catalytically active carrier material, and gamma-alumina which is derived from hydrated alumina rich in the bayerite modification yields an active catalytic composite possessing a greater degree of activity than a catalytic composite containing gamma-alumina which has been resolved from other forms of alumina.

A specific object of the present invention is to produce an alumina-combined halogen composite in which the alumina comprises from about 40% to about 95% by weight of the bayerite modification, which, upon drying and calcining, yields the substantially anhydrous form of gamma-alumina highly suitable for use as a catalytically active carrier material.

In another embodiment, the present invention provides a method for producing an alumina-combined halogen composite which comprises reacting aluminum with liquid water in the presence of a sufficient quantity of a mercury halide to yield an alumina-combined halogen composite, substantially free from unreacted aluminum, containing bayerite alumina and from about 0.1% to about 8% by weight of combined halogen based on the dry weight of the composite, recovering the resultant alumina-combined halogen composite and thereafter drying said composite.

In a specific embodiment, the present invention provides a method for producing a catalyst which comprises reacting aluminum with liquid water in the presence of a sufficient quantity of a mercury halide to yield an alumina-combined halogen composite substantially free from unreacted aluminum, containing from about 0.1% to about 8% by weight of combined halogen and from about 40% to about 95% by weight of bayerite alumina, drying the resultant alumina-combined halogen composite at a temperature of from about 200° F. to about 600° F., introducing platinum to said dried composite in an amount of from about 0.01% to about 1% by weight of said alumina-combined halogen composite, and thereafter calcining the resulting alumina-platinum-combined halogen composite.

It is recognized that the art teaches that alumina is formed on the surface of elemental aluminum upon exposure to wet air or oxygen; this surface alumina is epsilon-alumina, and is usually referred to as a protective coating which prevents the metallic aluminum under the coating from being converted to the oxide. In the prior art, this protective coating of epsilon-alumina is taught to be of a tenacious nature in that it adheres rigidly to the aluminum metal. Thus, the alumina coating, regardless of its thickness, is difficult to separate from the aluminum metal, whereby it is recovered uncontaminated with elemental aluminum. In our invention, the alumina is produced detached from the aluminum, uncontaminated by the latter, and substantially all of the aluminum present at the outset of the reaction is converted to alumina.

The usual commercial method of producing alumina is by purifying ores in which aluminum oxide is present. Another method is by the precipitation of aluminum hydroxide from aluminum salts. The preparation of alumina as practiced at present entails the addition of an alkaline reagent to aluminum chloride hexahydrate. The resulting precipitate requires many washing and filtering steps to remove undesirable impurities. The present invention offers a novel method of preparing alumina which eliminates the need for washing and filtration and thereby reduces the time and expense previously required to purify the alumina. As hereinbefore set forth, it is preferred that the final catalytic composite comprise anhydrous gamma-alumina resolved from hydrated alumina rich in the bayerite modification. As hereinbefore set forth, bayerite alumina may be transformed into boehmite alumina when contacted with hot water. In the preferred method, the alumina-combined halogen is not contacted with water, other than that present at the outset of the reaction, prior to being dried and/or calcined. By this method, the alumina produced comprises from about 40% to about 95% bayerite alumina which, as hereinbefore described, will subsequently yield highly active gamma-alumina.

By the method of our invention, alumina may be prepared by the interaction of water and aluminum, in the absence of an acid or other added electrolyte. Our one-step method is superior in that the alumina prepared thereby exists in the gel form, and requires only drying and calcining treatments to be converted to the preferred form of anhydrous gamma-alumina. The alumina sol, which is produced by other, multi-step processes, requires many additional treatments, some of which necessitate the use of costly chemical reagents prior to being converted to an alumina gel.

The aluminum used in our process may be any available type of commercial aluminum, although, if a high-purity alumina-combined halogen product is desired, it is preferable to start with high-purity aluminum. It is also within the scope of this invention to use aluminum alloys; however, since the present process will produce a very pure alumina-combined halogen composite, it is preferred to react aluminum of at least 99.5% purity with water to produce a high-purity alumina-combined halogen product.

The degree of subdivision of the aluminum is a factor determining the rate of the reaction. The smaller the size of the particles the greater the surface area of aluminum exposed to the water and, therefore, the more rapid the reaction with water. Powdered aluminum is a particularly desirable starting material, although aluminum turnings or granulated aluminum may be used. Aluminum pellets, prepared by dropping molten aluminum into water, have likewise proven to be very satisfactory for producing the alumina, those pellets below about one-half inch in average diameter being preferred.

The first step of the present invention comprises agitating the aluminum, water and catalytic material sufficiently so that the reaction which produces alumina proceeds at a desirable rate. The reaction velocity is dependent upon the temperature of the reactants, the degree of subdivision of the aluminum, the concentration or amount of the catalystic substance, and the degree of agitation given the mixture. Thus a reaction that proceeds slowly at a temperature of 212° F. with only a mild agitation or shaking of the mixture will proceed very rapidly if the mixture is vigorously agitated. At a temperature of 400° F., the reaction proceeds relatively rapidly even with a mild degree of agitation. However, if the mixture is subjected to vigorous agitation, the time necessary for complete reaction is substantially decreased.

It is a desirable feature of the present invention that liquid water be present and it is thus necessary, when temperatures above the normal boiling point are employed, to effect the reaction under sufficient pressure to maintain at least a portion of the water in the liquid phase. The critical temperature of water is 705.2° F.; the critical temperature being that temperature above which a gas cannot be liquefied by pressure alone. It is preferred to use liquid water since intimate contact and mixing between the aluminum and water is facilitated if there is a liquid phase. When practicing this invention, the aluminum reacts with water to form alumina and simultaneously the mercury-halide functions as a catalyst, accelerating the reaction; at the same time, the mercury-halide serves as a reactant, and the halogen component thereof combines with the aluminum and/or alumina.

The mercury-halide is not a true catalyst in that it reacts with the aluminum and is reduced to metallic mercury. The mercury-halide also differs from ordinary catalysts in that the halogen component thereof reacts with the aluminum and/or the alumina to form the halided aluminum. We have found that the mercury compound reacts with the aluminum and is reduced to metallic mercury which then appears to amalgamate with the aluminum. There is a difference in the catalytic effect of the various mercury halides, and it seems likely that the distribution of the mercury amalgam centers (which are probably cathodic) is an important factor in determining the reaction velocity. However, we do not intend our invention to be limited by this theory. The final composite comprises alumina and halided aluminum or alumina, and this composite is referred to herein either as an alumina-halided aluminum composite, or as an alumina-combined halogen composite.

When a mercury halide is used as a catalyst in this reaction, the reaction will proceed at a much lower temperature than if these compounds are absent. As an example, if 18 grams of aluminum and 180 grams of water are vigorously stirred at 200° F., the reaction proceeds very slowly; however, if approximately 1.2 grams of mercuric fluoride are added to the solution, the reaction proceeds at a much more rapid rate. The halogen that is present in the mercury-halide reacts substantially completely with the alumina and/or aluminum and, therefore, the concentration of the halogen in the final catalyst may be controlled by controlling the amount of mercury-halide used as the promoter. Or, conversely, the amount of mercury halide employed is determined by the quantity of halogen desired in the final catalyst. Alumina-combined halogen composites in which the concentration of the halogen is limited within specific ranges have special adaptability as catalysts. Combined fluorine is usually present within the range of from about 0.1% to about 5% by weight based on the alumina, and to attain these concentrations when using mercurous fluoride as the promoter, the latter is employed in amounts of from about 2.1% to about 110% by weight of the aluminum. These amounts correspond approximately to 0.1% and 5% by weight of combined fluorine in the final alumina-combined fluorine composite. Similarly, mercuric fluoride is used in amounts of from about 1.2% by weight to about 60% by weight based on the aluminum. Mercurous chloride is used in amounts of from about 1.2% by weight to about 105% by weight based on the aluminum, and mercuric chloride is employed in an amount of from about 0.7% to about 60% by weight based on the aluminum. These concentrations will produce a final alumina-combined chlorine composite containing combined chloride in concentrations of from about 0.1% to about 8.0% by weight of the final alumina-combined chloride composite.

Any mercury halide may be used within the scope of this invention, the mercuric halides being preferred, and mixtures of two or more mercury halides may also be used. Suitable, although not necessarily equivalent mercury-halogen compounds comprise mercurous bromide, mercuric bromide, mercuric bromide iodide, mercurous chloride, mercuric chloride, mercuric chloride iodide, mercurous fluoride, mercuric fluoride, mercurous fluosilicate, mercuric fluosilicate, basic mercuric fluosilicate, mercurous iodide, mercuric iodide, mercuric oxychloride, mercuric oxyfluoride, ammono basic mercuric bromide, ammono basic mercuric chloride, etc.

It has already been mentioned that it is preferable to use a liquid phase of water and, therefore, the preferred upper limit of temperature at which the reaction may proceed is the critical temperature of water, about 705° F. The reaction requires increasingly longer periods of time as the temperature of the reaction is decreased and where the time of the reaction is not important it is possible to effect the reaction at temperatures down to the freezing point of the water and reaction mixture, that is, about 32° F. or lower, although the reaction is quite slow at such low temperatures. Thus the temperature at which the reaction between aluminum and water in the presence of a mercury halide catalyst may be effected is within the range of about 30° F. to about 705° F.

Using the conditions and catalyst of our invention, the alumina-combined halogen composite is produced as an alumina gel at temperatures within the range of from about 30° F. to about 400° F. This is advantageous since normally a sol must be coagulated to produce the desired gel. The preferred temperature lies within the range of from about 30° F. to about 250° F., which range favors the production of bayerite alumina.

The reaction may be effected in any suitable type of equipment wherein the reactants are subjected to agitation, and preferably to vigorous stirring. The operation may be carried out in a continuous or batch-wise fashion. When temperatures above the normal boiling point of water are employed, it is necessary that the reaction vessel be capable of withstanding pressure sufficient to maintain a liquid phase of water. In a small scale production of the alumina-combined halogen composite by this process, a rotating pressure autoclave is satisfactory. When the temperatures employed are at, or below, the boiling point of water, the reaction may be effected in ordinary open equipment in which a means is provided for vigorous stirring or agitation of the reagents. It is, however, necessary that the equipment be constructed of materials which are not affected by water or aluminum and/or the promoter used, so that undesirable elements are not introduced into the desired final product. Hydrogen is produced as a by-product of the reaction and a means of venting must be provided if the pressure build-up, caused by the production of this hydrogen, is to be avoided. If the equipment will withstand this additional pressure, it is not necessary to vent the hydrogen continuously.

As hereinbefore mentioned, by careful control of the amount of mercury halide used, it is possible to form an alumina-combined halogen composite with the desired concentration of halogen. By control of the variables of temperature, degree of agitation and degree of subdivision of the aluminum particles, the time necessary for the reaction to achieve completion may be regulated.

As hereinbefore stated, the alumina-combined halogen mixture formed in this reaction is not filtered or washed. Heretofore, alumina-combined halogen composites required extensive filtering and washing in order to produce composites of the desired halogen concentration and/or of the desired low impurity level. Using the process of our invention the mercury formed therein settles out after the reaction, and any remaining traces of adsorbed mercury are volatile at rather low temperatures; these may be readily removed by heating the composite. The alumina-combined halogen composite is dried at a temperature of from about 200° F. to about 400° F., and is then subjected to calcination at elevated temperatures of from about 600° F. to about 1600° F. At these temperatures the mercury will be volatilized, and removed from the composite. The elimination of the washing and filtering procedures by the use of our process considerably reduces the time necessary to produce the composite, and likewise considerably reduces the cost of manufacture of these composites.

The alumina-combined halogen composite may be used in the form of rough granules; the dried gel may be ground and utilized as a fine powder, or it may be ground, mixed with a suitable lubricant and formed into pills.

The alumina-combined halogen composite of the present invention finds particular use as a catalyst component or catalyst within itself, especially in the petroleum industry. Alumina-combined chlorine catalysts are particularly effective isomerization catalysts or alkylation catalysts, being suitable for the alkylation of either iso-paraffins or aromatic hydrocarbons with olefins, the alkylation of aromatic hydrocarbons with alkyl halides and the like.

The alumina-combined halogen composite may be utilized as a catalytically active carrier material, and may be composited with other catalytic components. For example, when composited with from about 0.01% to about 1% platinum, an excellent reforming catalyst is produced, and, when used for this purpose, the combined chloride concentration lies within the range of from about 0.1% to about 8% by weight of the alumina and the combined fluorine concentration lies within the range of from about 0.1% to about 5% by weight of the alumina. The halided alumina composite also provides a superior carrier material for the preparation of alumina-aluminum chloride catalysts by subliming anhydrous aluminum chloride onto the dried halided alumina composite. The percent by weight of aluminum chloride in the alumina-aluminum chloride isomerization catalyst is from about 1% to about 50% by weight and preferably from about 5% to about 25% by weight.

The alumina-aluminum halide catalyst may be used for the isomerization of pure paraffinic compounds or pure naphthenic compounds, or the isomerization of a complex mixture of paraffinic and naphthenic compounds. The operating conditions employed in the isomerization process depend to some extent upon the particular concentration of aluminum chloride in the catalyst. In general, however, it will be found that the optimum temperature for most of the isomerization reactions will be within the range of from about 120° F. to about 400° F. The time of contact will vary from a few minutes to several hours. Pressures may range from approximately atmospheric to about 1000 atmospheres and the presence of a hydrogen chloride activator and/or hydrogen to control side reactions may be advantageous.

The following examples are introduced to further illustrate the novelty and utility of the present invention. It is not intended to limit unduly the present invention to the operating conditions, reagents, or concentrations employed therein.

EXAMPLE I

An alumina-combined fluorine composite was prepared as follows:

HR grade aluminum chips of approximately 1/16" to 3/32" wide, 1/4" long and slightly more than 1/16" thick were employed to prepare the composite. The purity of the aluminum was determined on an emission spectrograph which gave the following analysis: 0.004% iron, 0.005% copper, 0.005% magnesium, 0.02% silica, 0.02% calcium, the remainder being aluminum. Sixty grams of these aluminum chips were placed in a 5 liter, creased Pyrex flask equipped with two water condensers and a six-bladed Pyrex stirrer, the speed of which was controlled at 400 r.p.m. 1500 grams of distilled water and 2.6 grams of mercuric fluoride were added to the flask and the solution brought up to temperature of 210° F. After 17 hours of stirring at this temperature, 99.5% of the aluminum reacted and a fluid, white alumina gel was produced. An analysis performed by X-ray diffraction indicated a bayerite content of about 60% by weight. The amount of promoter utilized was based on a 0.35% fluorine content in the resulting dried alumina. After drying at 300° F. for 24 hours and at 500° F. for 4 hours, the alumina was ground into a powder, then commingled with Stearotex and formed into 1/8" by 1/8" cylindrical pills. The pills were then heated in air at 850° F. to burn off the lubricant. An analysis indicated the presence of 0.33 weight percent of fluorine as compared with the 0.35% fluorine content calculated; thus practically all of the fluorine was taken up by the alumina and distributed very uniformly. The composite may be used as a catalyst or may be further composited with other catalytic substances.

EXAMPLE II

Sixty grams of HR grade aluminum chips of the type used in Example I were placed in a 5 liter, creased Pyrex flask equipped with 2 water condensers and a 6-bladed Pyrex stirrer, the speed of which was controlled at 450 r.p.m. 1500 grams of distilled water and 0.089% of $HgCl_2$ by weight based on the solution were added to the flask and the solution brought up to a temperature of 206.6° F. After 21 hours of stirring at this temperature 99.3% by weight of the aluminum reacted to form an alumina hydrogel containing 0.30% chloride. X-ray diffraction indicated that the alumina gel consisted of about 60% by weight of bayerite alumina.

EXAMPLE III

A catalyst was prepared as follows: 60 grams of the aluminum chips previously described were placed in a 5 liter, creased Pyrex flask equipped with two water condensers and a 6-bladed Pyrex stirrer, the speed of which was controlled at 400 r.p.m. 1500 grams of distilled water and 2.62 grams of mercuric fluoride were added to the flask and the solution was brought to a temperature of 210.2° F. After seventeen hours of stirring at that temperature 99.5% of the aluminum had reacted to form an alumina-combined halogen gel, a major portion of which consisted of bayerite alumina. The composite was dried at 300° F. for 24 hours and at 500° F. for 4 hours. The composite was then ground into a powder, mixed with Stearotex and formed into 1/8" x 1/8" cylindrical pills in a pelleting machine. The pills were heated in air up to 932° F., thereby burning out the Stearotex. The pills were then calcined in air at 1202° F. for approximately 3 hours. The alumina-combined fluorine pills were then impregnated with a platinum-containing solution consisting of chloroplatinic acid dissolved in water containing 2 ml. of concentrated ammonium hydroxide per 100 ml. of solution. A sufficient quantity of this ammoniacal platinum solution was used to produce a final catalyst containing 0.3% platinum by weight. After the impregnation, the composite was calcined in air at 932° F. for 3 hours. 65 grams of these pills occupied approximately 100 cubic centimeters of volume and therefore the pills had an apparent bulk density of approximately 0.65 gm./cc. This catalyst contained 0.33% by weight of combined fluorine based on the alumina and 0.31% by weight of combined chlorine based on the alumina, the chlorine being deposited with the chloroplatinic acid.

This catalyst was used for the reforming of a Mid-Continent, straight-run naphtha having a boiling range of from 230° F. to 413° F. and a F-1 clear octane number of 34.0 at an average catalyst temperature of about 860° F., a pressure of 500 lbs. per sq. inch, a liquid hourly space velocity of 2.04 and a hydrogen to hydrocarbon mol ratio of 3.12. The analysis of the charge stock and the reformed product are shown in the following table:

*Table I*

| Catalysts | Charge | A | B |
| --- | --- | --- | --- |
| Initial boiling point, ° F | 230 | 110 | 115 |
| Percent below 212° F. and loss in Engler | 0 | 15.0 | 20.5 |
| Dispersion at 20° C | 73.0 | 111.2 | 114.0 |
| Reid vapor pressure, p.s.i.g | 0 | 5.1 | 5.6 |
| F-1 clear octane number | 34.0 | 84.8 | 89.2 |

It will be noted from the above Table I that catalyst "A" produced a reformate having a much higher octane number than the charge, a greater concentration of aromatics as shown by the dispersion, and a greater degree of volatility as shown by the vapor pressure and percent distilled over at 212° F.

EXAMPLE IV

A catalyst referred to as catalyst "B" was prepared substantially the same as catalyst "A" of Example III, however, instead of the 2.6 grams of mercuric fluoride, 1.33 grams of mercuric chloride were employed. The alumina-combined chlorine composite contained 0.31% of combined chlorine based on the dried alumina and 0.36% by weight of combined chlorine was brought in by the chloroplatinic acid impregnating solution. The resultant catalyst therefore contained approximately 0.67% by weight of combined chlorine based on the dried alumina.

The catalyst was used to reform the Mid-Continent naphtha the same as in Example III, and under substantially the same conditions. The results of this reforming operation using catalyst "B" are shown in Table I.

The foregoing examples clearly illustrate the benefits afforded through the utilization of the method of the present invention to produce an alumina-combined halogen composite.

We claim as our invention:

1. A method for producing an alumina-combined halogen composite which comprises reacting aluminum with liquid water in the presence of a sufficient quantity of a mercury halide to yield an alumina-combined halogen composite substantially free from unreacted aluminum and containing from about 0.1% to about 8% by weight of combined halogen based on the dry weight of the composite.

2. The method of claim 1 further characterized in that said mercury halide comprises mercurous fluoride.

3. The method of claim 1 further characterized in that said mercury halide comprises mercuric fluoride.

4. The method of claim 1 further characterized in that said mercury halide comprises mercurous chloride.

5. The method of claim 1 further characterized in that said mercury halide comprises mercuric chloride.

6. A method for producing an alumina-combined halogen composite which comprises reacting aluminum with liquid water in the presence of a sufficient quantity of a mercury halide to yield an alumina-combined halogen composite, substantially free from unreacted aluminum, containing bayerite alumina and from about 0.1% to about 8% by weight of combined halogen based on the dry weight of the composite, recovering the resultant alumina-combined halogen composite and thereafter drying said composite.

7. The method of claim 6 further characterized in that said alumina-combined halogen composite contains from about 40% to about 95% by weight of bayerite alumina, based upon the total weight of alumina.

8. The method of claim 7 further characterized in that said alumina-combined halogen composite is dried at a temperature of from about 200° F. to about 600° F.

9. A method for producing a catalyst which comprises reacting aluminum with liquid water in the presence of a sufficient quantity of a mercury halide to yield an alumina-combined halogen composite substantially free from unreacted aluminum, containing from about 0.1% to about 8% by weight of combined halogen and from about 40% to about 95% by weight of bayerite alumina, drying the resultant alumina-combined halogen composite at a temperature of from about 200° F. to about 600° F., and introducing to said dried composite a catalytic component selected from the group consisting of the metals and compounds of group VIII of the periodic table, and mixtures thereof.

10. The method of claim 9 further characterized in that said catalytic component comprises platinum.

11. The method of claim 10 further characterized in that said platinum comprises from about 0.01% to about 1% by weight of said alumina-combined halogen composite.

12. A method for producing a catalyst which comprises reacting aluminum with liquid water in the presence of a sufficient quantity of a mercury halide to yield an alumina-combined halogen composite substantially free from unreacted aluminum, containing from about 0.1% to about 8% by weight of combined halogen and wherein said alumina is from about 40% to about 95% by weight of bayerite alumina, drying the resultant alumina-combined halogen composite at a temperature of from about 200° F. to about 600° F., introducing platinum to said dried composite in an amount of from about 0.01% to about 1% by weight of said alumina-combined halogen composite, and thereafter calcining the resultant alumina-platinum-combined halogen composite.

13. The method of claim 12 further characterized in that said alumina-platinum-combined halogen composite is calcined at a temperature of from about 600° F. to about 1600° F.

14. The method of claim 12 further characterized in that said mercury halide comprises mercurous fluoride.

15. The method of claim 12 further characterized in that said mercury halide comprises mercuric fluoride.

16. The method of claim 12 further characterized in that said mercury halide comprises mercurous chloride.

17. The method of claim 12 further characterized in that said mercury halide comprises mercuric chloride.

18. A method for producing a catalyst which comprises reacting, at a temperature within the range of from about 30° F. to about 250° F., aluminum with liquid water in the presence of a sufficient quantity of a mercury halide to yield an alumina-combined halogen composite substantially free from unreacted aluminum, containing from about 0.1% to about 8% by weight of combined halogen and wherein said alumina is from about 40% to about 95% by weight of bayerite alumina, drying the resultant alumina-combined halogen composite at a temperature of from about 200° F. to about 600° F., introducing platinum to said dried composite in an amount of from about 0.01% to about 1% by weight of said alumina-combined halogen composite, and thereafter calcining the resultant alumina-platinum-combined halogen composite.

References Cited in the file of this patent

UNITED STATES PATENTS

| | | |
|---|---|---|
| 2,369,734 | Heard | Feb. 20, 1945 |
| 2,371,237 | Heard | Mar. 13, 1945 |
| 2,696,474 | Heard | Dec. 7, 1954 |
| 2,840,529 | Lefrancois | June 24, 1958 |